May 19, 1959　　　　　L. F. BEACH　　　　　2,886,897
ZENITH MERIDIAN INDICATOR
Filed Aug. 28, 1953　　　　　　　　　　　　4 Sheets-Sheet 4

INVENTOR
LENNOX F. BEACH
BY
Herbert H. Thompson
his ATTORNEY.

United States Patent Office 2,886,897
Patented May 19, 1959

2,886,897

ZENITH MERIDIAN INDICATOR

Lennox F. Beach, Sea Cliff, N.Y., assignor to Sperry Rand Corporation, a corporation of Delaware Application August 28, 1953, Serial No. 377,138

15 Claims. (Cl. 33—204)

This invention relates to a combined gyro compass and gyro vertical in which at least two gyroscopes are employed, and sometimes referred to as a zenith meridian indicator. An instrument of this character is described in the U.S. Letters Patent of Frederick D. Braddon, No. 2,729,107, issued January 3, 1956 for Gyroscopic Instruments, and Victor Vacquier, Andrew P. Cope and Richard Proskauer, No. 2,729,108, issued January 3, 1956 for Control Systems for Gyroscopic Instruments, both assigned to the assignee of the present application.

In the above noted patents, the fundamentals of such an instrument are disclosed in more or less mathematical and diagrammatic form. My invention is concerned with reducing the prior inventions to concrete, practicable form and designing the same so that each of the gyroscopes employed therein may be removed individually at will without disturbing the balance of the system or the other gyroscope, and so that the removed gyroscope may be replaced by a counterpart in a matter of a few minutes making the system operative without further adjustment. Other features of the invention will become apparent from the following description and claims.

Referring to the drawings.

Figure 1:
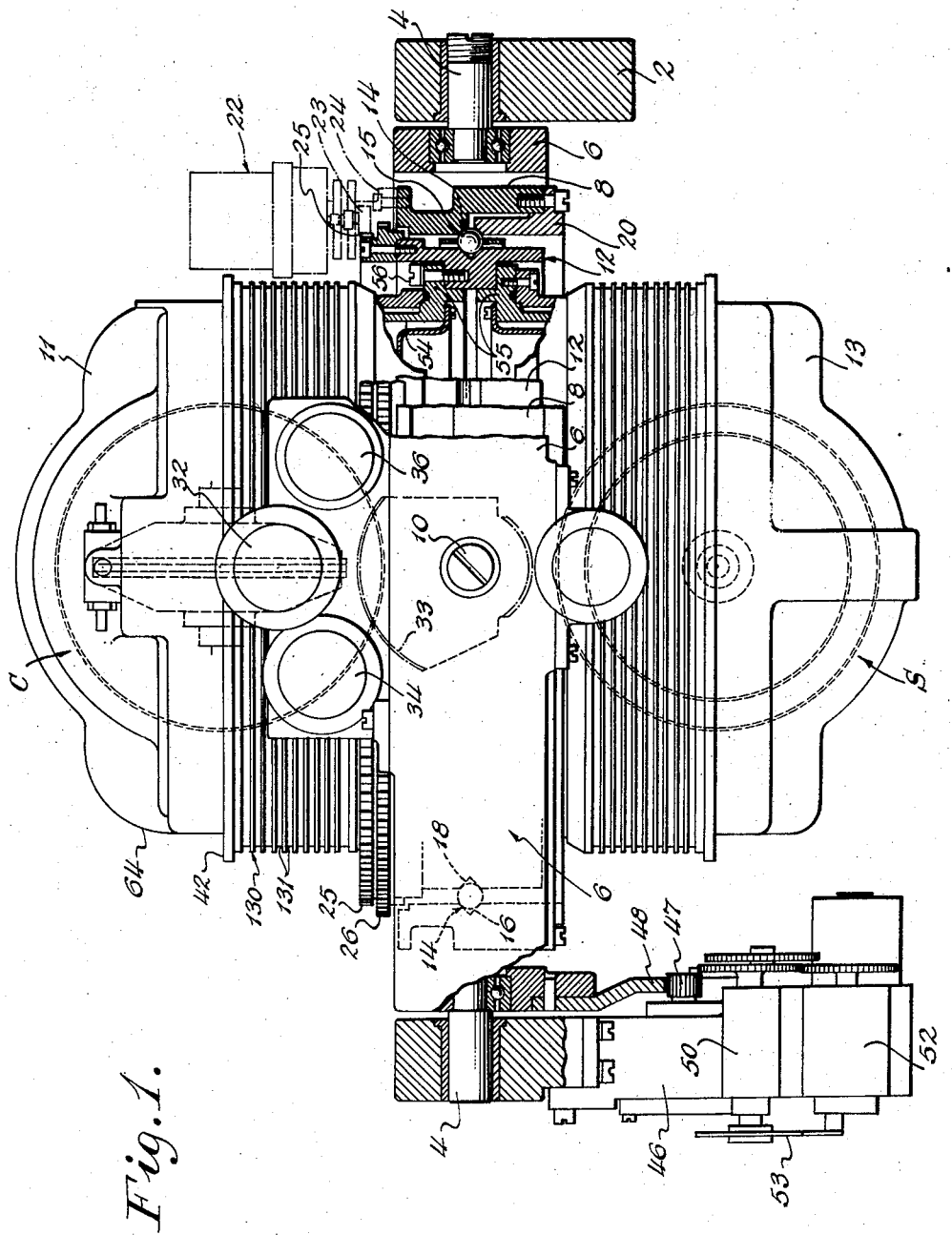
Fig. 1 is a side elevation, partially in section, of my improved zenith meridian indicator.

My zenith meridian indicator is shown as mounted in a binnacle 2 on a major horizontal axis 4—4, about which is pivoted the gimbal ring 6. Preferably the major axis 4—4 is placed fore and aft of the ship so that it constitutes the roll axis and the gimbal 6 may be referred to as the roll isolation gimbal. The main supporting ring 8 which may be referred to as a pitch isolation gimbal is pivoted within the gimbal 6, on the minor or pitch axis 10. Rotatably mounted on a vertical axis within pitch isolation gimbal 8 is the azimuth phantom ring or platform 12 upon which both gyroscopic units or sensitive elements 11 and 13 are mounted. A large annular anti-friction bearing 14 is provided between the gimbal 8 and the ring 12, said bearing being shown in the form of a circular ball race, the balls 15 bearing against the walls of a groove 16 in the ring 8 and a corresponding groove 18 in the ring 12. For purposes of ready assembly, the lower wall of the outer bearing 18 is provided with a detachable ring 20 which is secured to the bottom of ring 8. Platform 12 is rotated in azimuth from an azimuth or follow-up motor 22 mounted on a bracket 24, secured to the top of ring 8, the pinion and reduction gearing 23 on the azimuth motor driving the large gear 25 mounted on the top of the platform 12. A second gear 26 below the gear 25 serves to drive the fine and coarse compass transmitters 28 and 30.

Figure 2:
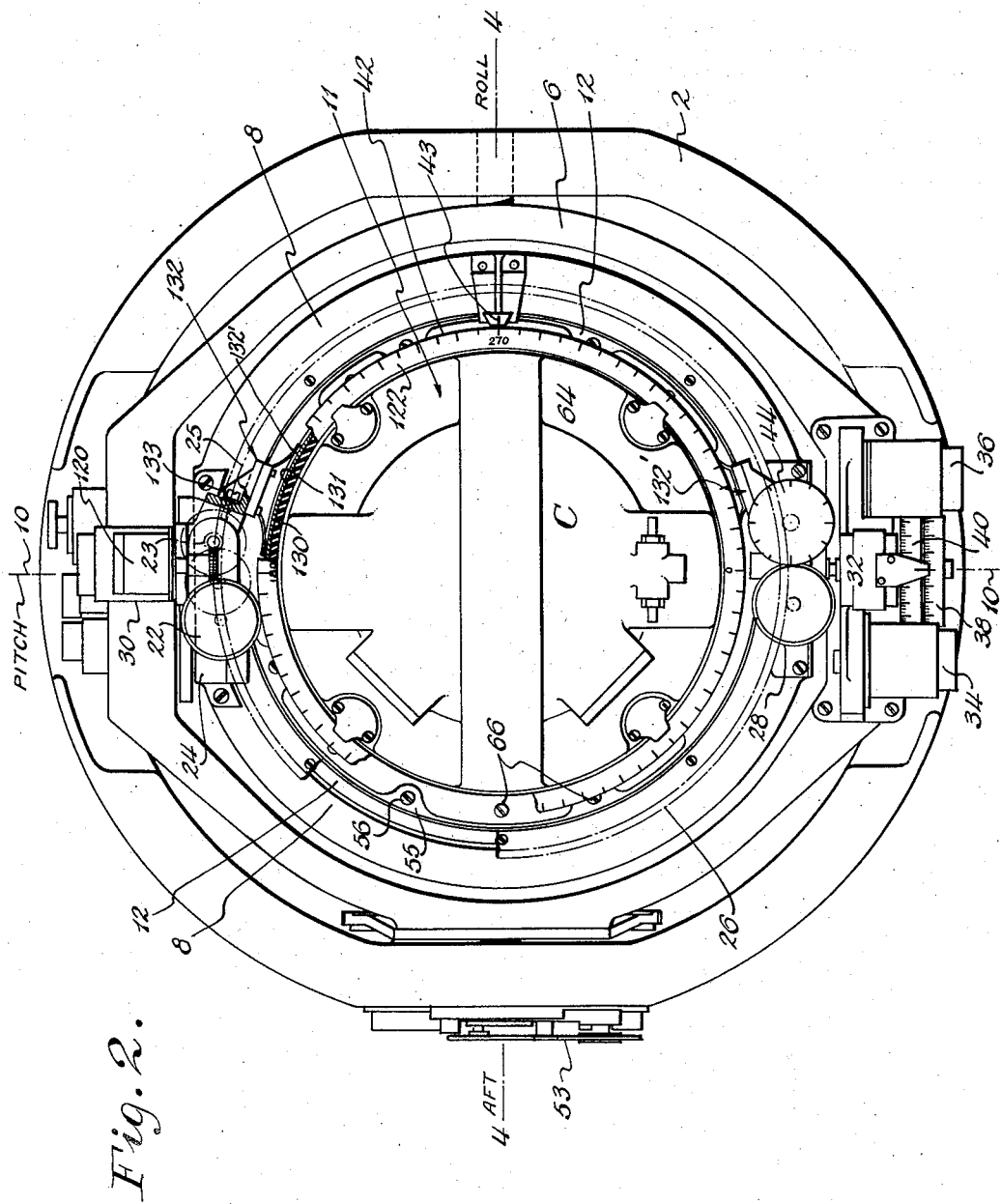
Fig. 2 is a plan view of the same.

For purposes of illustration, in Fig. 1 the azimuth motor has been shown 90 degrees from its position in Fig. 2 so that the mounting of the same on the ring 8 may be shown.

The system provides a roll attitude reference for the craft by stabilization of the roll isolation gimbal ring 6 about its major axis 4. It also provides a pitch attitude reference for the craft by stabilization of the pitch isolating gimbal ring 8 about its axis 10. The pitch stabilizing servomotor is shown at 32 and the coarse and fine pitch transmitters or controllers at 34 and 36, respectively, the angle of the pitch being shown by the coarse and fine dials 38 and 40. Motor 32 is geared through reduction gearing (not shown) to a gear sector 33 on ring 8. The ship's heading is shown on the large annular dial 42 on the top of housing or cover 64 and read on lubber line 43 fixed to gimbal 8 while the fine heading is shown on the smaller dial 44 geared to gear 26. Stabilization in roll is secured by the servomotor 46, the pinion 47 of which drives the gear segment 48 secured to ring 6. Said servomotor also drives the coarse and fine roll transmitters 50 and 52 and coarse and fine roll dials 53. Most of the parts so far described except platform 12 and its supported parts are fixed in azimuth to the ship.

With reference to Fig. 1, the gyro compass element C of the system is provided by the gyroscopic unit 11. Gyroscope unit 13 provides the stabilizing gyroscopic element S of the system. As shown, the housings of the system elements C and S respectively extend above and below the platform 12. Each of the system elements C and S has an internal vertical ring, the elements being mounted on the platform 12 with the respective vertical rings thereof in alignment. The upper element C is shown as provided with a base 54 having a bottom external annular shoulder or ring 55 which rests on an internal flange within the rotatable ring or platform 12 and is detachably secured thereto by a plurality of bolts 56 passing through the shoulder 55 and into the platform. The base 54 is shown of irregular shape and supports the main horizontal bearings 62 of a gimbal ring 74 in brackets 63 extending upwardly therefrom. The outer cover part 64 of the gyroscopic element C is clamped to base ring 55 by bolts 66 to hold it tightly against sealing washer 67 at its base to provide a liquid seal to retain a liquid 70 which fills the space between cover 64 on the base 54 and the rotor case or casing 72 or gyro sphere and its supporting gimbal system. Said support is shown as comprising vertical and horizontal rings 76 and 74 rigidly secured at right angles to one another, and mounted for freedom about the horizontal axis 62 within the brackets 63. The gyro sphere 72 in turn is pivoted for freedom about a vertical axis 78, 79 within vertical ring 76. The rotor case or sphere element 72 is accordingly supported by the ring 76 within the housing with freedom about a normally horizontal axis corresponding to the major axis 62 of the ring and a normally vertical axis corresponding to the minor axis of the ring, the minor axis of support for the case being aligned with the platform axis. A plurality of slip rings 131 are mounted in an insulating ring 130 on the exterior of each cover 64 to lead current to and from the gyro sphere 72 and its several pick-offs, torquers, rotor, etc.

Figure 3:
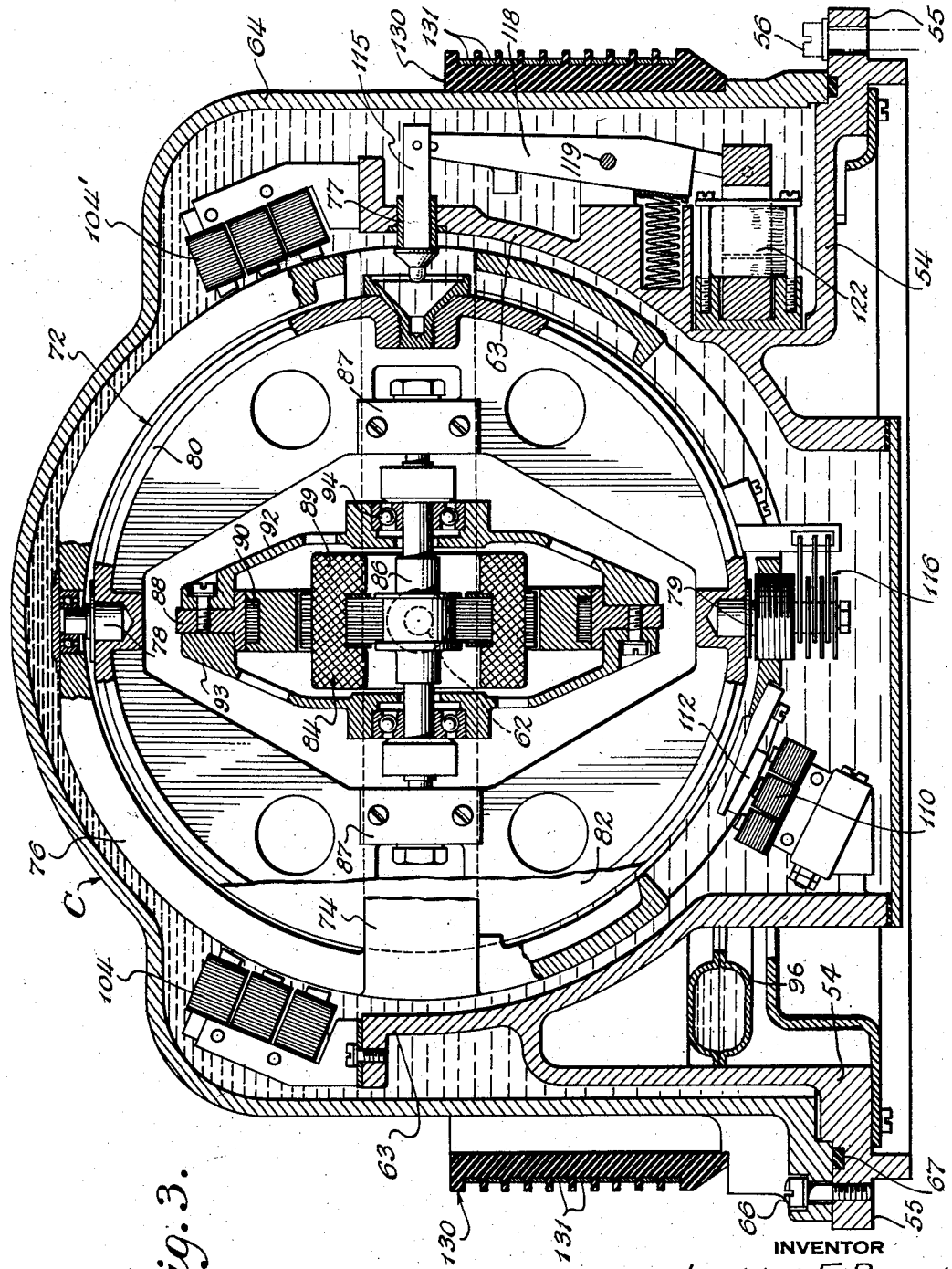
Fig. 3 is a vertical section of the upper gyro unit, the section being taken in the vertical north-south plane through the center.
Figure 4:
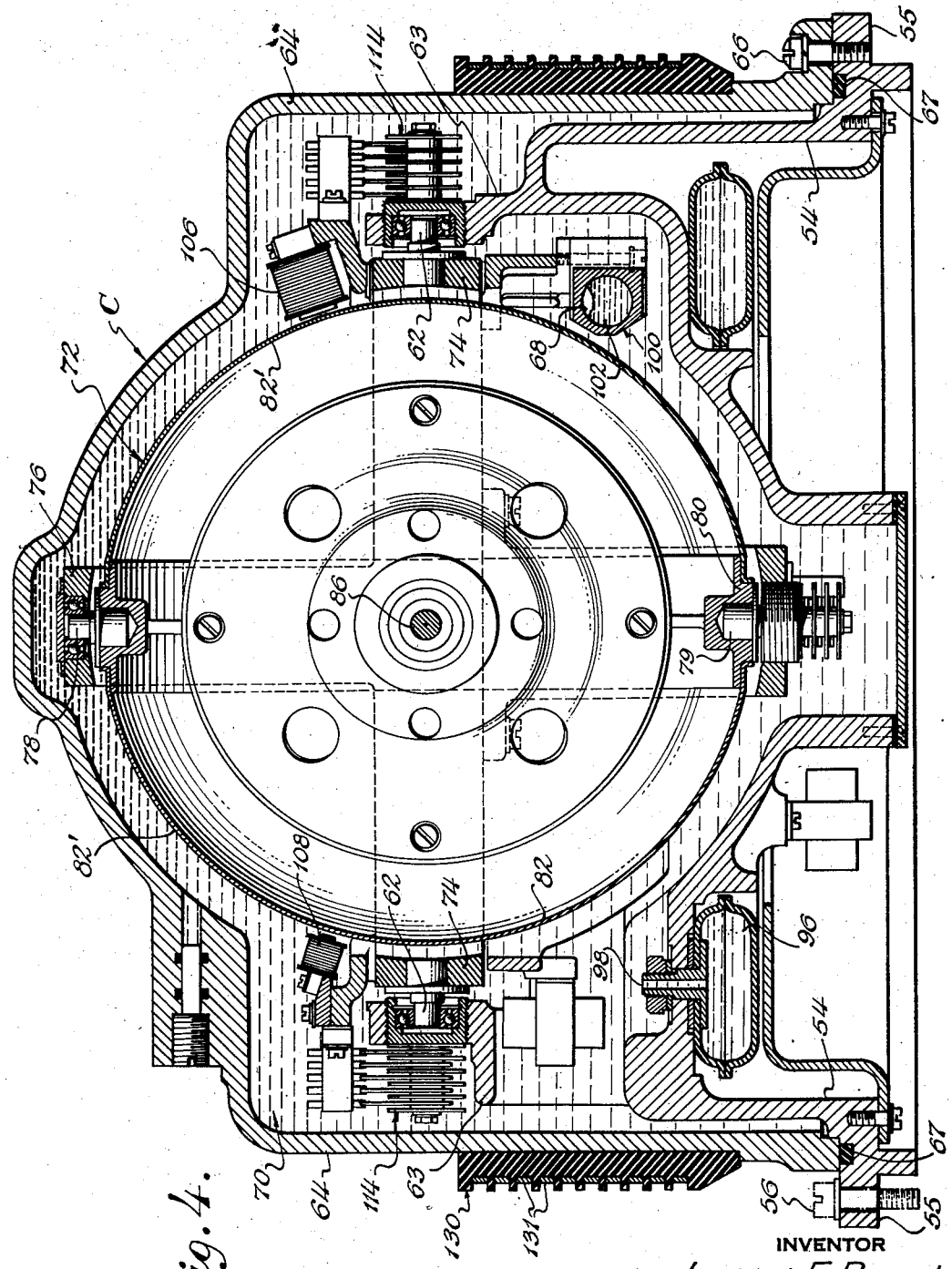
Fig. 4 is a similar section taken in the vertical east-west central plane.

As shown in Figs. 3 and 4, the gyro sphere 72 is made up of a central or rotor bearing ring 80 which carries the upper and lower trunnions of the vertical pivots 78, 79. On the two sides of the ring 80 are fitted twin cups or hemispheres 82, 82', each of which is sealed against the bevelled edges of the ring 80. The sphere is made liquid and gas-tight so that the liquid without the same cannot enter. It is also preferably evacuated and partially filled with helium. Accordingly, the rotor case or casing 72 of the described gyroscopic structure is a spherical sealed container. An electric motor for driving the gyroscopic rotor is mounted within the sphere 72 and is shown as comprising a wound stator 84 mounted on a shaft 86 fixed in spaced brackets 87 within the sphere. The gyroscopic rotor is made up of a central flywheel 88 provided with a squirrel cage rotor construction 90 and a pair of end bells 92, 93 clamped to the periphery of the rotor and journalled at their centers on anti-friction bearings 94 upon the fixed shaft 86. The electric motor and mechanical rotor parts of the sphere 72 are hence entirely symmetrical and thermal expansion and contraction will take place equally in both directions from the center thereof.

An expansion chamber 96 may be provided for the liquid within the housing or cover 64, the chamber being shown in the form of a hollow ring with flexible walls, the interior of which is in communication with the liquid within said chamber through tube or tubes 98, as shown in Fig. 4.

Meridian seeking properties are imparted to the gyro compass element C by a liquid level device 100, Fig. 4, secured to the equatorial ring 74 so as to be tilted with the ring about its horizontal axis 62. The liquid level device 100 is almost filled (but leaving an air bubble 68) with a conducting fluid or electrolyte 102 of sufficient viscosity to prevent surging of the liquid in phase with the roll and pitch of the ship. The output of the level device 100 is linear, that is, proportional to tilt, within the narrow limits of normal tilts encountered in gyro compasses beyond which the output may remain constant, since it is not necessary in this type of compass to secure ballistic deflection. The level device 100 on ring 74 tilts with tilt of the gyro sphere 72 about the axis 62 which provides the E-W axis of the gyro compass element C. In the system, device 100 functions in the manner described in the hereinbefore noted Patent No. 2,729,108 to Vacquier et al., wherein the level device 63 is shown in Fig. 1 as mounted on the rotor case 18 in a position to respond to tilt of the case about its E-W axis 21. The structure of the device 100 may correspond to that of the specific device shown in Fig. 3 of the noted patent. The output of the liquid level device 100 controls one or more torquers 104 and 104' which may be of the E type and are mounted on a portion of the framework 54 on opposite sides of the E-W horizontal axis 62 of the gyro compass element C so as to exert additive torques about the axis 62 when the gyro sphere 72 becomes inclined. This provides meridian seeking properties to the gyro compass element C about its vertical axis on the vertical ring 72. Preferably the torquers 104 and 104' and liquid level device 100 are so designed as to give the compass element C a period of about 90 minutes. Also controlled from the output of the liquid level device 100 is the damping torquer 106 which is mounted on the horizontal ring 74 so as to exert a torque about the vertical axis of the gyro sphere 72 to reduce the tilt and damp the same.

The heretofore described follow-up servomotors 22, 32 and 46 are actuated from pick-offs that are included on the respective elements C and S. For controlling the azimuth servomotor 22, I have shown a pick-off 108, mounted on ring 74 and adapted to produce a signal upon relative movement in azimuth between the gyro sphere 72 and the ring 74. For controlling the roll and pitch servomotors 32 and 46, I have shown a pick-off 110 secured to the framework 54 and operating in conjunction with an armature 112 secured to the ring 76, so that upon relative tilt of the gyro sphere 72 about horizontal axis 62, a signal is produced to actuate the proper servomotor 32 or 46 to maintain the platform level about the E-W axis.

While I have not illustrated the interior of the slave or gyroscopic stabilizing element S, it will be understood that its construction is similar to that of the gyro compass element C. It likewise has torquers similar to the azimuth torquers 104 and 104', but which are controlled not from a liquid level device, but from a pick-off similar to 108 acting to detect relative displacement in azimuth between the ring 74 and the gyro sphere 72 for element S, the arrangement being such that the rotor spin axis of the stabilizing element S is maintained East-West; in other words, at right angles to the spin axis of the gyroscopic rotor of the gyro compass element C. Similarly, a leveling torquer like 106 may also be provided, actuated from a liquid level device like level device 100 but sensitive to tilt about the N-S axis. The liquid employed in both level device 100 and its counterpart is preferably of sufficient viscosity to effectively damp the bubble movement and maintain its motion in an out of phase relation to the rolling and pitching motions of the ship. By limiting the torque to that due to a small tilt and by the damping action described, intercardinal errors are substantially eliminated and since ballistic deflection is not needed in the improved system, the resulting damping error may be reduced. The relation between torquing effort and signal output of level device 100 in the system is proportional with tilt about the E-W axis from a level condition until a 10 minute tilt is reached. At this point, the output of the device 100 is at a maximum and the effort of the torquers 104, 104' is accordingly so limited.

There is also provided a pick-off on the gyroscopic stabilizing element S similar to 110, but acting about horizontal axis 62 of the gyro sphere which lies North-South, the output of which controls the servomotors 32 and 46. The element S like the gyro compass element C has a period of about 85–90 minutes. Both gyroscopic elements C and S, therefore, have characteristics of the Schuler pendulum and therefore are not subject to the major errors due to turns or changes in speed of the ship.

Since the gyro sphere 72 of the gyro compass element C remains fixed in azimuth while the outer gimbal rings 6 and 8 turn with the ship, it is necessary to resolve the outputs of the pick-off 110 and corresponding pick-off on the stabilizing element S with reference to the roll and pitch axes of the ship. For this purpose, there is provided a roll and pitch resolver 120, Fig. 2, which is rotated from the gear 25, and which resolves the output of the two pick-offs into the roll and pitch components. A more complete description of the resolver is contained in the aforesaid Patent No. 2,729,108 of Vacquier, Cope and Proskauer.

It should be observed that not only are the gyro spheres 72 of both elements C and S immersed and floated in liquid, but also the several pick-offs and other parts including the lead-in coiled metal ribbons, the density of the fluid being so proportioned that the spheres and their attached parts are floated in neutral equilibrium in the liquid, so that friction about the horizontal bearings is minimized, and also the unbalancing effects of shift of the spheres due to any play in the horizontal bearings 62 is eliminated, since each is floated in neutral equilibrium about its coincident center of gravity and center of support.

A caging device is also provided to lock each gyro sphere 72 when the system is not operating. This is shown in the form of a plunger 115 operated from a lever 118 pivoted at 119 and controlled by a solenoid 122. When the solenoid is energized the plunger is pushed to the left in Fig. 3 to pass through hole 77 in bracket 63 and engage a conical depression in the gyro sphere 72.

From the foregoing it should be apparent that my improved zenith meridian indicator is not only of compact generally symmetrical construction, but that the apparatus is generally symmetrical with respect to the normally aligned vertical axes of the individual gyro spheres or casings 72 of the respective elements C and S. In the improved system, the center of gravity of the platform 12 having the elements C and S mounted thereon and the included supports substantially coincides with the center of support provided for the platform by the servo driven gimbal rings 6 and 8, the axes of the rings intersecting at the approximate center of gravity location. The normally aligned vertical axes of the rotor casings or spheres 72 of the elements C and S also pass through this point. This feature has been found to be extremely important in sizeable apparatus stabilized by follow-up motors, since ofttimes such apparatus is subject to violent jars and other acceleration forces which would place a heavy load on the gearing connecting the servomotors and stabilized platform. By having the center of support of the gimbals 6 and 8 at the center of gravity of the platform 12 with the elements C and S thereon, such damage is avoided.

Each of the two gyroscopic elements C and S employed may also be removed without disturbing the other, and in fact, replaced by a new element. Thus, if the upper element C in Fig. 1 fails or needs overhauling, all that need be done is to take out the bolts 56 fastening shoulder 55 to the inner annular flange of the rotatable ring 12 and to loosen or take off the brushes 132' which bear on the slip rings 131. To this end, each set of brushes is mounted on a common block 132 secured by screws 133 to the bracket 24 on the gimbal ring 8. By taking out the screws the brushes may be removed or swung out of the way and the entire element C shown in Fig. 1 removed. The same, of course, is true of the lower element S.

This feature is likewise very important since it is much more difficult to repair and balance elements such as C and S on shipboard than it is on land in the laboratory, because a ship is nearly always in motion of some form such as rolling or pitching, or being under way, and the deck is seldom exactly level from this cause and because of small lists. In my design, either or both of the two elements C and S may be removed and easily shipped to a testing laboratory, since they are small in size as compared to the complete stabilized apparatus, and when each element is properly balanced and adjusted, further accurate balance of the complete system becomes unnecessary.

Since a complete outline of the operation of the system as a whole is contained in the aforesaid patents of Braddon and of Vacquier, Cope and Proskauer, further explanation of the complete system is thought unnecessary in this application.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A zenith meridian indicator comprising a universally gimballed support, a platform mounted thereon with freedom about a vertical axis, two like gyroscopic elements mounted one above and the other below said platform, each element comprising a housing, a rotor casing, and a gimbal ring mounting each rotor casing within its housing with freedom about a vertical axis normally aligned with the axis of the platform and a horizontal axis, means causing one of said elements to act as a gyro compass, and means slaving the other thereto to maintain its spin axis E–W.

2. A zenith meridian indicator comprising a universally gimballed support, a platform mounted thereon with freedom about a vertical axis, two like gyroscopic elements mounted one above and the other below said platform, each element comprising a spherical sealed container, a sealed housing for each container, and a gimbal ring mounting each container within its housing with freedom about a vertical axis normally aligned with the axis of the platform and a horizontal axis, one of said elements constituting a gyro compass and the other a stabilizing gyroscope slaved to the gyro compass to maintain its spin axis E–W, and a liquid filling the space between each container and its housing and of sufficient density to float each container and its gimbal ring in neutral equilibrium.

3. A zenith meridian indicator for ships comprising a universally gimballed support, a platform mounted thereon with freedom about a vertical axis, two like gyroscopic elements mounted one above and the other below said platform, each element comprising a rotor case, a housing for each case, and a gimbal ring mounting each case within its housing with freedom about a vertical axis normally aligned with the axis of the platform and a horizontal axis, one of said elements constituting a gyro compass and the other a gyroscope slaved thereto to maintain its spin axis E-W, a follow-up pick-off for said gyro compass responsive to relative turning of said gyro compass rotor case and housing in azimuth, an azimuth motor connected to turn said platform about the first named vertical axis actuated from said pick-off, a second pick-off between the rotor case of said gyro compass and its housing responsive to relative tilt about an E-W axis, a third pick-off between the rotor case of said slave gyroscope and its housing about a N-S axis, roll and pitch servomotors for stabilizing said support about the ship's axes, and a resolver unit between the outputs of said last two pick-offs and said servomotors.

4. A zenith meridian indicator comprising a universally gimballed support, a platform mounted thereon with freedom about a vertical axis, two like gyroscopic elements mounted one above and the other below said platform, each element comprising a spherical container, a housing for each container, and a gimbal ring mounting each container within its housing with freedom about a vertical axis normally aligned with the axis of the platform and a horizontal axis, one of said elements constituting a gyro compass with its spin axis N-S and the other a gyroscope slaved thereto to maintain its spin axis E-W, a follow-up pick-off between the container of said gyro compass and housing responsive to relative turning of said container and housing in azimuth, an azimuth motor connected to turn said platform about its vertical axis actuated from said pick-off, a second pick-off between the container of said slave gyroscope and its housing and responsive to disagreement in azimuth therebetween, and a torquer adapted to exert torques about the horizontal axis of said slave gyroscope to maintain its spin axis E-W.

5. A zenith meridian indicator for ships comprising a universally gimballed support, a platform mounted thereon with freedom about a vertical axis, two like gyroscopic elements mounted one above and the other below said platform, each element comprising a spherical container, a housing for each container, and a gimbal ring mounting each container within its housing with freedom about a vertical axis normally aligned with the axis of the platform and a horizontal axis, one of said elements constituting a gyro compass and the other a gyroscope slaved thereto to maintain its spin axis E-W, and a liquid filling the space between each container and its housing and of sufficient density to float each container and its gimbal in neutral equilibrium, a follow-up pick-off between the container of said gyro compass and housing responsive to relative turning of said container and housing in azimuth, an azimuth motor connected to turn said platform about its vertical axis actuated from said pick-off, a second pick-off between the container of said gyro compass and its housing responsive to relative tilt about an E-W axis, a third pick-off between the container of said slave gyroscope and its housing responsive to relative tilt about a N-S axis, roll and pitch servomotors for stabilizing said support, and a resolver unit oriented by said platform and electrically connected between the outputs of said last two pick-offs and said servomotors to convert their outputs into ship's coordinates.

6. A zenith meridian indicator comprising a universally gimballed support, a platform mounted thereon with freedom about a vertical axis, two like gyroscopic elements mounted one above and the other below said platform, each element comprising a sealed outer housing, a rotor casing, and a gimbal ring mounting each rotor casing within its housing with freedom about a vertical axis normally aligned with the axis of the platform and a horizontal axis, a gravitational controller and a torquer controlled thereby for one of said elements causing it to act as a gyro compass, a similar torquer for the other element and a controller for the latter responsive to departure of its spin axis from an E-W position for controlling said last mentioned torquer.

7. A zenith meridian indicator comprising a universally gimballed support, a platform mounted thereon with freedom about a vertical axis, two like gyroscopic elements detachably mounted one above and the other below said platform with the center of gimballed support being approximately at the center of gravity of the elements, platform and support, each element comprising a sealed outer housing containing like rotor cases mounted to precess about normally vertical axes aligned with the axis of the platform, slip rings on each housing, brushes secured to the support normally bearing on said slip rings, detachable means for securing each housing above and below said platform, and detachable means for securing said brushes to said support.

8. A zenith meridian indicator comprising a universally gimballed support, a platform mounted thereon with freedom about a vertical axis, two like gyroscopic elements detachably mounted one above and the other below said platform, each element comprising a sealed outer housing, slip rings on each housing, brushes secured to the support normally bearing on the slip rings, a rotor casing, and a gimbal ring mounting each rotor casing within its housing with freedom about a vertical axis normally aligned with the axis of the platform and a horizontal axis, means causing one of said elements to act as a gyro compass, means slaving the other thereto to maintain its spin axis E-W, detachable means for securing one housing above and the other below said platform, and detachable means for securing said brushes to said support.

9. A gyroscopic apparatus having a support universally gimballed to a base with two mutually perpendicular normally horizontal axes, motive means for each of said horizontal axes operable to stabilize the support, a platform mounted on said support with freedom about a vertical axis, motive means on said support operable to maintain a fixed orientation of the platform about its vertical axis, a gyro compass element having a housing carried by said platform and a rotor case supported therein in neutral equilibrium with freedom about an E-W horizontal axis and a normally vertical axis in alignment with the platform axis, means for imparting meridian seeking properties to the rotor case of said gyro compass element, a pick-off between the housing and case of said gyro compass element providing an output for operating said orientation maintaining means, a gyroscopic stabilizing element having a housing carried by said platform and a rotor case supported therein in neutral equilibrium with a freedom about a normally horizontal axis and a vertical axis also in alignment with the platform axis, means for slaving said gyroscopic stabilizing element to the gyro compass element to direct the horizontal case axis of the stabilizing element in a N-S direction, and means for operating the motive means for each of the horizontal support axes including a pick-off having a signal proportional to the tilt of the case of the gyro compass element from a level condition about its E-W axis and a second pick-off having a signal proportional to the tilt of the case of the stabilizing element from a level condition about its N-S axis.

10. The combination, in a gyroscopic apparatus, of a platform movable about a vertical axis, a universal support for the platform having respective mutually perpendicular, normally horizontal, axes, a follow-up motor for stabilizing the platform about one of said support axes, a gyroscopic stabilizing element having a housing carried by said platform and a rotor case, means for supporting said rotor case in neutral equilibrium within said housing with freedom about a normally horizontal major axis and a normally vertical minor axis aligned with the platform axis, means for slaving the gyroscopic element to direct the normally horizontal axis of the rotor case in a N-S direction, and means for operating said stabilizing motor including a pick-off whose signal is proportional to tilt of the rotor case from a level condition about its N-S directed horizontal axis.

11. A gyroscopic apparatus having a support universally gimballed to a base with two mutually perpendicular, normally horizontal, axes, motive means for each of said horizontal axes operable to stabilize the support, a platform mounted on said support with freedom about a vertical axis, motive means on said support operable to maintain a fixed orientation of the platform about its vertical axis, two like gyroscopic elements mounted one above and the other below said platform so that the center of gravity of the elements, platform and support lies substantially at the point of intersection of the horizontal axes of the support, and means responsive to one of the gyroscopic elements for operating said orientating motive means and means responsive to both of the gyroscopic elements for operating both of said support stabilizing motive means.

12. Apparatus as claimed in claim 11, in which each gyroscopic element includes a rotor case having a normally vertical axis located in alignment with the axis of the platform, and said platform axis also passes through the point of intersection of the horizontal axes of the support.

13. Apparatus as claimed in claim 11, in which the respective gyroscopic elements are individually removable units that are detachably mounted on the platform.

14. Gyroscopic apparatus comprising a stable platform, means for mounting said platform with freedom about a vertical axis, a first gyroscopic element with a housing carried by said platform, said element having a rotor case and a ring supporting said case in said housing with freedom about a major horizontal axis and a minor vertical axis normally aligned with the axis of the platform; a second gyroscopic element with a housing also carried by said platform, said second element having a rotor case and a ring supporting the case of said second gyroscopic element in the last named housing with freedom about a second major horizontal axis and a second minor vertical axis also normally aligned with the axis of the platform.

15. Gyroscopic apparatus as claimed in claim 14, in which the major horizontal axes of the respective rings supporting the gyroscopic elements are mutually perpendicular, one being directed N-S, and the other being directed E-W.

References Cited in the file of this patent

UNITED STATES PATENTS

| | | |
|---|---|---|
| 1,743,533 | Davis | Jan. 14, 1930 |
| 1,930,082 | Boykow | Oct. 10, 1933 |
| 1,950,517 | Rawlings | Mar. 13, 1934 |
| 2,046,998 | Boykow | July 7, 1936 |
| 2,109,283 | Boykow | Feb. 22, 1938 |
| 2,208,207 | Boykow | July 16, 1940 |
| 2,419,948 | Haskins | May 6, 1947 |
| 2,591,697 | Hays | Apr. 8, 1952 |
| 2,618,159 | Johnson et al. | Nov. 18, 1952 |
| 2,677,194 | Bishop | May 4, 1954 |
| 2,713,726 | Dixson | July 26, 1955 |
| 2,729,107 | Braddon | Jan. 3, 1956 |
| 2,729,108 | Vacquier et al. | Jan. 3, 1956 |
| 2,811,785 | Braddon et al. | Nov. 5, 1957 |